(12) United States Patent
Mall, Jr. et al.

(10) Patent No.: US 12,475,821 B2
(45) Date of Patent: Nov. 18, 2025

(54) SYSTEMS AND METHODS FOR AN INTERACTIVE AUGMENTED REALITY KIOSK

(71) Applicant: Universal City Studios LLC, Universal City, CA (US)

(72) Inventors: Howard Bruce Mall, Jr., Winter Springs, FL (US); Matthew Waller, Flowery Branch, GA (US); Aaron Chandler Jeromin, Winter Garden, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/596,445

(22) Filed: Mar. 5, 2024

(65) Prior Publication Data

US 2024/0331594 A1 Oct. 3, 2024

Related U.S. Application Data

(60) Provisional application No. 63/455,174, filed on Mar. 28, 2023.

(51) Int. Cl.
*G09G 3/00* (2006.01)
*A63J 21/00* (2006.01)
(Continued)

(52) U.S. Cl.
CPC .............. *G09G 3/003* (2013.01); *A63J 21/00* (2013.01); *G02B 26/0816* (2013.01);
(Continued)

(58) Field of Classification Search
CPC .............. G09G 3/003; G09G 2340/04; G09G 2354/00; A63J 21/00; G02B 26/0816;
(Continued)

(56) References Cited

U.S. PATENT DOCUMENTS 4,237,492 A * 12/1980 Roth .................. G02B 23/12
348/343
9,843,744 B2 12/2017 Ackley et al.
(Continued)

FOREIGN PATENT DOCUMENTS

EP 2508933 A1 10/2012
WO 2020016488 A1 1/2020

OTHER PUBLICATIONS

PCT/US2024/019196 International Search Report and Written Opinion mailed Jul. 1, 2024.
(Continued)

*Primary Examiner* — Brent D Castiaux
(74) *Attorney, Agent, or Firm* — Fletcher Yoder, P.C.

(57) ABSTRACT

A show effect system of an amusement park may include an enclosure, an interaction space within the enclosure, where the interaction space receives an object from outside of the enclosure, and a display system that presents imagery. The show effect system may also include a beam splitter positioned to enable visibility, from a viewing portion, into the interaction space through the beam splitter and of the virtual image via reflection off the beam splitter. A sensor of the show effect system may monitor the interaction space and provide sensor data related to the object within the interaction space. One or more controllers of the show effect system may be communicatively coupled to the sensor and the display system and may perform operations including determining one or more parameters of the object based on the sensor data and generating image data based on the parameter of the object.

20 Claims, 8 Drawing Sheets

(51) Int. Cl.
*G02B 26/08* (2006.01)
*G02B 30/00* (2020.01)
*G06F 3/01* (2006.01)

(52) U.S. Cl.
CPC ............ *G02B 30/00* (2020.01); *G06F 3/013* (2013.01); *G09G 2340/04* (2013.01); *G09G 2354/00* (2013.01)

(58) Field of Classification Search
CPC ...... G02B 30/00; G02B 30/56; G02B 27/144; A63G 31/00; G06F 3/013
See application file for complete search history.

(56) References Cited

U.S. PATENT DOCUMENTS

| | | |
|---|---|---|
| 2007/0035511 A1 | 2/2007 | Banerjee et al. |
| 2011/0107216 A1 | 5/2011 | Bi |
| 2012/0113140 A1* | 5/2012 | Hilliges ................ A63F 13/213 345/633 |
| 2015/0264339 A1 | 9/2015 | Riedel |
| 2016/0267577 A1 | 9/2016 | Crowder et al. |
| 2017/0236491 A1 | 8/2017 | Foster et al. |
| 2022/0157044 A1* | 5/2022 | Schick ...................... G06T 7/20 |
| 2022/0253153 A1 | 8/2022 | Guarasci et al. |

OTHER PUBLICATIONS

Bijster, Bjorn, Live Size Hologram streamed with Pepper's GHOST by Glimm, Jun. 15, 2021, pp. 1-4, https://www.glimmdisplay.com/live-size-hologram-streamed-with-peppers-ghost-by-glimm/.

Microsoft Research, HoloDesk: Direct 3D Interactions with a Situated See-Through Display, Oct. 19, 2011, pp. 1-2, YouTube, https://www.youtube.com/watch?v=JHL5tJ9ja_w.

* cited by examiner

SYSTEMS AND METHODS FOR AN INTERACTIVE AUGMENTED REALITY KIOSK

CROSS-REFERENCE TO RELATED APPLICATION

This application claims priority to and the benefit of U.S. Provisional Application No. 63/455,174, entitled "SYSTEMS AND METHODS FOR AN INTERACTIVE AUGMENTED REALITY KIOSK" filed Mar. 28, 2023, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Throughout amusement parks and other entertainment venues, special effects can be used to help immerse guests in the experience of a ride or attraction. Immersive environments may include three-dimensional (3D) props and set pieces, robotic or mechanical elements, and/or display surfaces that present media. For example, amusement parks may provide an augmented reality (AR) experience for guests. The AR experience may include presenting virtual objects to guests, and the virtual objects may provide unique special effects to the guests. The special effects may enable the amusement park to provide creative methods of entertaining guests, such as by simulating real world elements in a convincing manner.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a show effect system of an amusement park may include an enclosure, an interaction space within the enclosure, where the interaction space receives an object from outside of the enclosure, and a display system (any suitable display (e.g., liquid crystal display (LCD), light emitting diode (LED) display, organic light emitting diode (OLED) display, micro-LED), a light field display, and/or a projector with screen) that presents imagery. The show effect system may also include a beam splitter positioned to enable visibility, from a viewing portion (e.g., viewing position), into the interaction space through the beam splitter and of the virtual image via reflection off the beam splitter. A sensor of the show effect system may monitor the interaction space and provide sensor data related to the object within the interaction space. One or more controllers of the show effect system may be communicatively coupled to the sensor and the display system. The one or more controllers may perform operations including determining one or more parameters of the object based on the sensor data, generating image data based on the parameter of the object, instructing transmittal of the image data to the display system (e.g., a projector), and instructing the display system to present the imagery based on the image data.

In an embodiment, a non-transitory computer-readable medium includes instructions that, when executed by one or more processor(s), may cause the one or more processor(s) to perform operations including determining one or more parameters of an object disposed within an interaction area of a show effect system based on sensor data received from one or more sensors monitoring the interaction area. The object may be visible, from a viewing location, as a transmitted element through a beam splitter. The operations may also include generating image data based on the one or more parameters of the object, and instructing a display system to project one or more virtual images onto the beam splitter based on the image data to cause the one or more virtual images to be visible, from the viewing location, via reflection off the beam splitter as a reflected element that overlaps with the transmitted element.

In an embodiment, an attraction system for an attraction may include an enclosure with a beam splitter that defines an interaction space and a viewing portion within the enclosure. The interaction space may receive an object. The viewing portion may include a display system that may project one or more virtual images onto the beam splitter, and the beam splitter may enable visibility of the object within the interaction space through the beam splitter and enable visibility of the one or more virtual images projected onto the beam splitter via reflection off the beam splitter. The attraction system may also include one or more sensor(s) that track movement of the object within the interaction space and a controller that may receive the sensor data from the one or more sensor(s). The sensor data may be indicative of the movement of the object within the interaction space. The controller may generate image data based on the movement of the object within the interaction space and instruct the display system to project the virtual image onto the beam splitter based on the image data to cause the one or more virtual image to be visible via the reflection off the beam splitter at a first location of visibility that is based on a second location of the visibility of the object through the beam splitter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
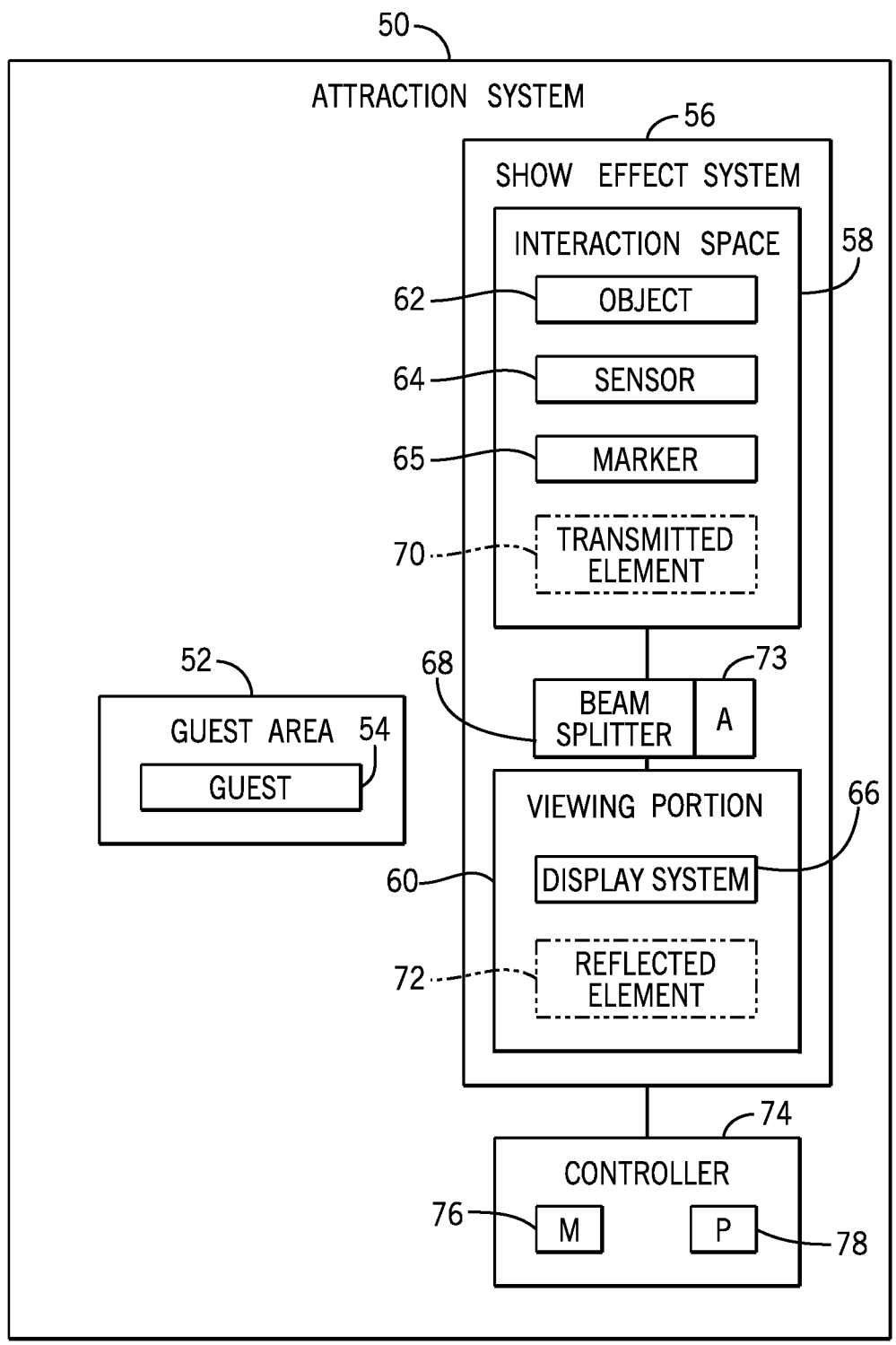
FIG. 1 is a schematic diagram of an embodiment of an attraction system within an amusement park or theme park, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to providing show effects for an amusement or theme park. The amusement park may include a variety of features, such as rides (e.g., a roller coaster), theatrical shows, set designs, performers, and/or decoration elements, to entertain guests. Show effects may be used to supplement or complement the features, such as to provide the guests with a more immersive, interactive, and/or unique experience. For example, the show effects may be presented along with real world objects to provide an interactive experience for the guests.

The attraction system may include a show effect system configured to present virtual or simulated objects that supplement the appearance of real world objects via a Pepper's Ghost system. A Pepper's Ghost system may employ a primary area (e.g., a background scene), a secondary area (e.g., an augmented reality scene), and an optical beam splitter (e.g., glass). The optical beam splitter may be arranged to enable transmission of imagery within the primary area through the optical beam splitter. The optical beam splitter may also reflect imagery of the secondary area. As such, the guest may observe imagery from the primary area (e.g., real imagery transmitted from the primary area through the optical beam splitter) and imagery from the secondary area (e.g., virtual imagery reflected from the secondary area off the optical beam splitter) that are combined, superimposed, or overlaid with respect to one another via the optical beam splitter.

Embodiments of the present disclosure are directed to a show effect system utilizing a Pepper's Ghost-based technique to provide a realistic portrayal of combined elements of the secondary area and the primary area, as those areas are described above. For example, as illustrated in FIGS. 2-6, the show effect system may include an aperture (e.g., slot, hole, e.g., aperture 90) to receive a real world object (e.g., physical object, appendage, prop) via guest interaction in the primary area (e.g., interaction space 58). The imagery of the elements of the secondary area (e.g., imagery on a display, such as a liquid crystal display (LCD), viewing portion 60) may be adjusted or manipulated to provide distortion of, visual alteration of, represented interaction with, or any other suitable enhancement to the imagery of the real world object in the primary area. To this end, the primary area may include a sensor (e.g., IR camera) to detect the object and track a location of the object (e.g., location relative to the optical beam splitter) within the primary area. Detection of the object may include any sensed parameter related to the object. In order to more realistically portray that the element (e.g., virtual object) of the secondary area appears to be physically positioned in the primary area with respect to a perspective of the guest, the imagery of the elements of the secondary area may be generated based on the location of the object. As such, the imagery of the elements of the secondary area may be superimposed, overlaid, or combined with the imagery from the primary area. For example, the show effect system disclosed herein may provide a realistic show effect to the guest via augmented reality without the need or use of wearable technology, such as a headset or goggles. Thus, operations (e.g., maintenance, cleaning, repair, control of each individual wearable object) and/or costs (e.g., installation costs, maintenance costs) associated with the wearable technology may be avoided while enhancing the experience of the guests. Additionally, the show effect system may be more readily implemented and operated, such as without having the guests equip wearable technology to enable experience of provided show effects.

In certain instances, the show effect system may include one or more sensors (e.g., forward facing sensors) to detect a presence of a guest and a perspective (e.g., line of sight) of the guest. For example, the show effect system may track an eye movement of the guest to determine a focal point. In another example, the show effect system may track a location of the guest's height relative to the primary area or secondary area to determine the guest's perspective. In response to determining the guest perspective, the show effect system may adjust an angle of the optical beam splitter to improve visibility of the imagery of the elements for the secondary area. Additionally or alternatively, the show effect system may include one or more covers to reduce or block ambient light, thereby improving visibility of the imagery provided for the secondary area.

With the preceding in mind, FIG. 1 is a schematic diagram of an embodiment of an attraction system 50 within an amusement park or theme park. The attraction system 50 is illustrated as including a guest area 52 with a guest 54 positioned therein and a show effect system 56, which is viewable and potentially accessible from the guest area 52. As an example, the guest area 52 may include a path (e.g., a walkway, a queue, a line) or open space through which the guest(s) 54 may pass. As another example, the guest area 52 may include a space (e.g., a seating area) where the guest(s) 54 may be positioned to view a performance. As a further example, the guest area 52 may include a ride vehicle that may move and carry the guest(s) 54 throughout the attraction system 50.

Furthermore, the attraction system 50 may include the show effect system 56 (e.g., a Pepper's Ghost-based system, an aerial based imagery system) that may provide entertainment to the guest(s) 54 located in the guest area 52 and/or within the attraction system 50. The show effect system 56 may include an areade-like configuration that uses a Pepper's Ghost-based technique to create show effects (e.g., visual effects) viewable by the guest(s) 54. To create the show effect, an optical beam splitter of the show effect system 56 may enable transmission of imagery within the primary area through the optical beam splitter and may also reflect imagery within a secondary area. Additionally or alternatively, the show effect system 56 may use an aerial based imagery technique to create the show effects. For example, the optical beam splitter may enable transmission of imagery within a primary area through the optical beam splitter and a retro-reflector may reflect the imagery to create the show effect. The reflected imagery may appear as an aerial image or an image floating within the show effect system 56. The retro-reflector may be adjacent to the optical beam splitter and made of a reflective material. As such, the show effects may be presented to the guests 54.

The show effect system 56 may include one or more augmented reality kiosks located throughout the attraction system 50 as part of a quest for the guests 54. The show effect system 56 may include a support (e.g., a countertop, a table) to accommodate a physical object (e.g., food, drink, souvenir), and the show effect system 56 may utilize a sneeze-guard to shield the object and also to display information regarding the object to the guest(s) 54. In any of these examples, the show effect system 56 may include an interaction space 58 (primary area, background area) for guest interactions (e.g., guest input), a viewing portion 60 (secondary area, augmented reality scene) for the guest(s) 54 to view the show effects (e.g., show effect projections), and a beam splitter 68 that separates the interaction space 58 and the viewing portion 60 from one another.

The interaction space 58 may receive an object 62 (e.g., an apple) and one or more sensor(s) 64 of the show effect system 56 may operate to detect a location of the object 62 within the interaction space 58. In the illustrated embodiment, the sensor(s) 64 is located in the interaction space 58. However, in other embodiments, the sensor(s) 64 may be located anywhere that allows the sensor(s) 64 to detect the object 62. The object 62 may be any suitable physical object (e.g., token, book, food, hand) positioned within the show effect system 56. In one embodiment, the interaction space 58 may include an aperture or opening to enable movement of the object 62 into and/or out of the interaction space 58. For example, the guest 54 may insert the object 62 into the interaction space 58 via the aperture. The show effect system 56 may present different show effects based on the inserted object 62 to provide an interactive experience for the guest 54. For example, the guest 54 may insert a token into the interaction space 58 as part of a quest, and the show effect system 56 may present show effects, such as a treasure chest, which may be viewed by the guest(s) 54 to enhance the appearance of the token. In another example, the guest 54 may insert their hand into the interaction space 58 via the aperture, such as to retrieve a physical object (e.g., food, book, card) positioned within the interaction space 58 for purchase. The show effect system 56 may present show effects, such as information about the physical object, to enhance the experience (e.g., shopping experience) of the guest 54 viewing the physical object.

The interaction space 58 may include one or more of the sensor(s) 64 to track a location of the object 62 within the interaction space 58. The sensor(s) 64 may be a camera (e.g., optical camera, three-dimensional (3D) camera, infrared (IR) camera, depth camera), a position sensor (e.g., sonar sensor, radar sensor, laser imaging, detection, and ranging (LIDAR) sensor), and the like. For example, the sensor(s) 64 may generate video data of the object 62 (e.g., in the IR spectrum, which may not be visible to the guest(s) 54). The sensor(s) 64 may represent multiple sensors positioned in different locations (e.g., multiple locations within and outside of the interaction space 58) to generate different sensor data (e.g., video data, image data) indicative of the positioning of object 62. In an embodiment, the interaction space 58 may include one or more markers 65, such as IR reflective markers, ultra-violet markers, and the like, which may facilitate determination of the positioning of the object 62. For example, the markers 65 may be disposed at specific locations, such as in a grid pattern, within the interaction space 58, and the position of the object 62 may be determined relative to the specific locations of the markers 65 to facilitate determination of the positioning of the object 62. In another example, the markers 65 may have a known shape (e.g., circle, square, diamond) be disposed with a known configuration, such as in a pattern, at pre-determined angles, and the like. As a specific example, a location of the object 62 may be determined based on feedback from the sensor(s) 64 indicating that certain markers 65 are not observable because they are covered or blocked by the object 62.

In an embodiment, the sensor(s) 64 may also detect a presence and/or a perspective (e.g., line of sight) of the guest(s) 54. For example, the sensor(s) 64 may be a camera positioned to monitor the guest(s) 54 and may generate sensor data of the guest(s) 54 during operation of the show effect system 56. For example, the sensor(s) 64 may be between the guest(s) 54 and the viewing portion 60. The sensor data may include facial features, eye movement, height, arm length, and/or a position of the guest(s) 54. For example, the sensor data may include a relative position between the guest(s) 54 and the show effect system 56. As further described herein, the sensor data may be analyzed to determine a line of sight of the guest(s) 54 and adjust the show effect system 56 to improve visibility of the show effects. In an additional or alternative embodiment, the sensor(s) 64 may detect movement of the guest(s) 54 and may generate sensor data indicative of guest attributes. For example, the sensor(s) 64 may generate sensor data of facial features or other attributes of the guest(s) 54. The show effect system 56 may then operate to provide a show effect based on such sensor data, including an identity of the guest 54 (e.g., based on facial recognition) or other attributes of the guest (e.g., identity, height, size, weight, clothing, hairstyles, accessories, tattoos). The show effect system 56 may also operate to provide a show effect based on user input. The user input may include guest attributes (e.g., height size, weight, age, color-blindness) or any guest preferences.

Additionally, the show effect system 56 may include the viewing portion 60 that may generate and project virtual images (e.g., imagery that serves as a component of an augmented or virtual reality presentation) to provide an augmented reality scene for the guest(s) 54. To this end, the viewing portion 60 may include a display system 66, to create and project the virtual images for the guest(s) 54. The display system 66 may be any suitable display (e.g., liquid crystal display (LCD), light emitting diode (LED) display, organic light emitting diode (OLED) display, micro-LED), and/or a projector with screen that receives image data and projects (e.g., displays) the image data as a virtual image. The display system 66 may also include three-dimensional displays, such as a volumetric display, a light field display, a stereoscopic display, a lenticular display, and the like. The virtual image may be adjusted or manipulated to enhance (e.g., distort, alter, superimpose, interact with) the appearance of the object 62 within the interaction space 58. For example, the virtual image may be a scaly lizard mask that transforms the appearance of the guest's hand (e.g., as viewed from the guest's perspective) into a lizard hand. In another example, the virtual image may be one or more map(s) that provide additional information of the attraction system 50 and the guest(s) 54 may interact with the map to view the information. Still in another example, the virtual image may be one or more string(s) of text overlaid on the object 62 (e.g., as viewed from the guest's perspective), where the text describes certain features of the object 62 (e.g., as determined based on image recognition).

In one embodiment, the virtual image (e.g., imagery) may be any suitable 2-dimensional image output by (e.g., projected by) the display system 66. For example, the virtual image may be a static image such as a non-changing picture or image. In another example, the virtual image may be a dynamic image and/or video that changes over time. In an additional or alternative embodiment, the virtual image may include a three-dimensional image that may be static or dynamic. For example, the display system 66 may include a light field display, which may include an array of surfaces (e.g., lenses) that manipulate how light converges, focuses, and/or is directed. The array of surfaces may cause light to focus at different locations, such as different depths with respect to the guest(s) 54, to generate imagery with an appearance of layering, contouring, and/or texture, thereby forming a 3-dimensional profile for a projected image. In another example, the display system 66 may include multiple displays 66 that each generate a portion (e.g., slice) of a three dimensional virtual image and a combination of the portions forms the image. Each portion generated by a respective display 66 may be a two dimensional image or a three dimensional image. Still in another example, the display system 66 may include one display that may be moved to different locations and generate different virtual images to create a three dimensional image due to persistence of vision of the guest(s) 54 (e.g., the viewer). The display system 66 may be positioned to project the virtual images onto the beam splitter 68. The virtual image may include one or more virtual images projected by the display system 66 that appear in one or more locations as the reflected element 72 off the beam splitter 68.

The beam splitter 68 may combine (e.g., superimpose, overlay) the appearance of the object 62 from the interaction space 58 with imagery (e.g., virtual image projected by the display system 66) from the viewing portion 60, thereby providing show effects to the guest(s) 54. For example, the beam splitter 68 may be partially transmissive and partially reflective, and the guest(s) 54 may view an element through the beam splitter 68, as well as an element reflected off the beam splitter 68. Thus, from the guest area 52, the guest(s) 54 may view the object 62 positioned in the interaction space 58 as a transmitted element 70 (e.g., at a location of visibility) that is transmitted or visible through the beam splitter 68, and the guest(s) 54 may view the virtual image projected by the display system 66 in the viewing portion 60 as a reflected element 72 (e.g., at a location of visibility) that is reflected off the beam splitter 68 and towards the guest 54.

To this end, the beam splitter 68 may be made from a material, such as glass, plastic, a foil, and/or a semi-transparent mirror, that includes both transmissive and reflective properties to enable viewing of the object 62 of the interaction space 58 through the beam splitter 68 as the transmitted element 70 and viewing of virtual images of the viewing portion 60 reflected off the beam splitter 68 as the reflected element 72. As such, the guest(s) 54 may view combined imagery including the transmitted element 70 and the reflected element 72. In certain instances, the beam splitter 68 may have a flat or planar profile. In other instances, the beam splitter 68 may have a curved or concave profile that may manipulate or change an appearance of the object 62 and/or the image projected by the display system 66. Furthermore, the beam splitter 68 may be angled (e.g., at a 45 degree angle) with respect to a line of sight of the guest(s) 54 and/or with respect to the display system 66 to reflect the image projected by the display system 66 in a desirable manner toward the guest(s) 54. In certain instances, the beam splitter 68 may be coupled to an actuator 73 that adjusts the beam splitter 68 (e.g., by rotating, orienting, and/or linearly translating the beam splitter 68) based on the perspective of the guest(s) 54 (e.g., line of sight). Additionally or alternatively, the actuator 73 may adjust a distance between the beam splitter 68 and the display system 66 (e.g., by translating the beam splitter 68). Thus, the actuator 73 may further adjust an appearance of the reflected element 72, as viewed by the guest(s) 54.

In an embodiment, the show effect system 56 may include a cover that may be disposed about the viewing portion 60 to facilitate visibility of the reflected element 72, such as to reduce or block ambient light or glare onto the beam splitter 68. For example, the show effect system 56 may include a cloth or fabric that shrouds a side of the viewing portion 60. In another example, the cover may extend past a boundary of the display system 66 to reduce or block light from entering the viewing portion 60 to improve visibility of the virtual images (e.g., as reflected off the beam splitter 68). The show effect system 56 may operate to adjust for visibility (e.g., via provision of varying color shades (e.g., for color contrast adjustments) varying shade (for increased light intensity) based on incoming light (e.g., sunlight, streetlights) based on detection of the light (e.g., via one or more light sensors that measure glare or direct light) or based on timing (e.g., a timer may be set to initiate adjustments based on known lighting scenarios). In an embodiment, the show effect system 56 may include one or more inputs (e.g., buttons, touch-screen, knobs) for guest input and the show effect system 56 may adjust a visibility of the virtual images based on the guest input. For example, the guest(s) 54 may turn a knob to cause an increase in the visibility of the reflected element 72. To this end, the show effect system 56 may include one or more light source(s) (e.g., OLED, LED) that output an amount of light to adjust a brightness level of the virtual images as reflected off the beam splitter 68. For example, the one or more light source(s) may be an LED that may be modulated to increase amount of light outputted to increase the brightness level of the interaction space 58, thereby increasing the brightness level of the virtual images as reflected off the beam splitter 68. In another example, the one or more light source(s) may decrease an amount of light outputted to increase a contrast between the virtual image as reflected off the beam splitter 68 and improve visibility of the image. Additionally or alternatively, the one or more light source(s) may adjust a color of the interaction space 58. For example, the one or more light source(s) may include multiple LEDs of different colors that can be modulated to output color, such as red, green, blue, and so on. In this way, the color contrast level of the virtual images reflected off the beam splitter 68 may be adjusted.

In an embodiment, the guest(s) 54 may input one or more guest attributes using the one or more inputs and the show effect system 56 may adjust the virtual images based on the guest attributes. For example, the guest(s) 54 may input a height, a color blindness status, a color preference, and so on. As further described herein, the show effect system 56 may adjust a position of the beam splitter 68 based on a height and/or a line of sight of the guest(s) 54 to improve visibility of the virtual images as reflected off the beam splitter 68. The show effect system 56 may adjust a color of the virtual images based on a color blindness attribute of the guest(s) 54. To this end, the show effect system 56 may generate the virtual images based on colors visible to the guest(s) and/or by removing colors not visible to the guest(s) 54 or color combinations not differentiable by the guest(s) 54 from the virtual image. In this way, visibility of the virtual images may be improved. In another example, the guest(s) 54 may select a color preference (e.g., via the one or more inputs) and the show effect system 56 may generate the virtual image based on the color preference. Returning to the lizard hand example, the guest(s) 54 may indicate that green as a color preference and the show effect system 56 may generate a green scaly lizard mask. Additionally or alternatively, the display system 66 may include one or more displays 66 that may individually or collectively generate the virtual images. For example, a first display 66 may generate a first portion of the green scaly lizard mask and a second display 66 may generate a second portion of the green scaly lizard mask. In another example, the first display 66 may generate a green scaly lizard mask and a second display 66 may adjust the color of the lizard mask by generating a red scaly lizard mask to overlay and form a yellow scaly lizard mask. Still in another example, the first display 66 and the second display 66 may generate the lizard mask and a third display 66 may generate a colored background, which may adjust a brightness level of the lizard mask and/or color contrast between the lizard mask and the background and improve a visibility of the virtual images as reflected off the beam splitter 68.

The show effect system 56 may include or coordinate with a controller 74 (e.g., a control system, an automated controller, a programmable controller, an electronic controller, control circuitry, a cloud-computing system) configured to operate the show effect system 56 to provide the interactive experience to the guest(s) 54. For example, the controller 74 may be communicatively coupled (e.g., via one or more wires, via wireless communication (e.g., via transmitters, receivers, transceivers)) to the sensor(s) 64, the display system 66, and/or the actuator 73. The controller 74 may include a memory 76 and a processor 78 (e.g., processing circuitry). The memory 76 may include volatile memory, such as random-access memory (RAM), and/or non-volatile memory, such as read-only memory (ROM), optical drives, hard disc drives, solid-state drives, or any other non-transitory computer-readable medium that includes instructions to operate the show effect system 56. The processor 78 may be configured to execute such instructions. For example, the processor 78 may include one or more application specific integrated circuit(s) (ASICs), one or more field programmable gate array(s) (FPGAs), one or more general purpose processor(s), or any combination thereof. In certain instances, the controller 74 may include one or more controllers that are communicatively coupled and may individually or collectively perform actions described herein. Additionally or alternatively, the controller 74 may include one or more processors 78 and/or one or more memories 76 that may individually or collectively perform the actions described herein.

In an embodiment, the controller 74 may receive the sensor data from the sensor(s) 64 and operate to identify the object 62, identify a location of the object 62, and transmit image data (e.g., image data generated based on the sensor data provided by the sensor(s) 64) to the display system 66 to generate the virtual images. For example, the controller 74 may utilize image analysis techniques to determine a size, a shape, a color, a texture, a reflectivity, a brightness, an orientation, and/or a type of the object 62. Then, the controller 74 may identify a corresponding characteristic (e.g., a size, a shape, a type) of image data to transmit to the display system 66. For example, the controller 74 may identify the object 62 as a ticket and generate image data with information about the ticket, such as a ticket type, a stay duration, a price of the ticket, and so on. In another example, the controller 74 may identify the object 62 as a souvenir (e.g., book) and generate image data associated with the souvenir, such as a special effect or a price. To generate a realistic special effect, the controller 74 may determine a location of the object 62 and determine a corresponding projection position of the virtual image to provide a desirable appearance of the reflected element 72 in coordination with the object 62. For example, the controller 74 may determine a location of the object 62 based on a grid pattern of markers 65 positioned within the interaction space 58. The controller 74 may determine a relative distance between the object 62 and the beam splitter 68 based on multiple images captured by the sensor(s) 64 and indicative of the object 62 with respect to various markers 65 positioned at known locations (e.g., known coordinates in a 3-dimensional coordinate system of the interaction space 58). In some embodiments, the sensor(s) 64 may include one or more LiDAR sensor(s) that can be utilized to determine positioning information. Additionally or alternatively, the controller 74 may use image analysis techniques to utilize a shadow of the object 62 to determine a size of the object 62 and/or a location of the object 62 relative to the beam splitter 68. The controller 74 may also continue to track a location of the object 62 and adjust (e.g., update) the image data transmitted to the display system 66. For instance, the controller 74 may adjust a size and/or a location of the virtual image projected by the display system 66 based on the location of the object 62.

As an example, the controller 74 may transmit image data to the display system 66 that portrays movement and/or size adjustment of a reflected element 72 in response to determined movement of the object 62 (e.g., relative to the beam splitter 68). For instance, the controller 74 may instruct the display system 66 to operate to provide a reflected element 72 that may superimpose onto the appearance of the object 62 to alter (e.g., distort, manipulate, adjust, augment) the appearance of the object 62 viewed by the guest 54. For instance, the controller 74 may instruct the display system 66 to project a larger virtual image (relative to a previously projected image) in response to determining the object 62 is within a threshold distance of the beam splitter 68 (e.g., moving closer to a viewer), and the controller 74 may instruct the display system 66 to project a smaller virtual image (relative to a previously projected image) in response to determining the object 62 is beyond the threshold distance away from the beam splitter 68 (e.g., moving away from the viewer). Thus, the virtual image may provide a reflected element 72 that may appear to conform to the transmitted element 70 viewed by the guest(s) 54. As such, the show effect system 56 may provide realistic or other desirable portrayal of combined imagery (e.g., transmitted element 70 and reflected element 72) and provide an interactive experience for the guest(s) 54. In an embodiment, the controller 74 may determine an appearance of a reflected element 72 based on sensor data received from the sensor(s) 64. The controller 74 may determine whether the appearance of the reflected element 72 is desirable (e.g., matches a target appearance) and may operate the display system 66, such as to instruct the display system 66 to adjust the virtual image being projected in response to the appearance of the reflected element 72 being undesirable.

In one embodiment, the controller 74 may be configured to instruct the actuator 73 to adjust a position of the beam splitter 68 based on a location of the guest(s) 54 (e.g., viewer(s)). For example, the controller 74 may receive sensor data and operate to determine the perspective of the guest(s) 54. The controller 74 may identify a position/orientation of the guest(s) 54 (e.g., a position/orientation of a head of the guest(s) 54), a height of the guest(s) 54, an eye level/position, eye movement, and the like of the guest(s) 54 to determine a perspective of the guest(s) 54. For example, the controller 74 may determine a region of the beam splitter 68 viewed by the guest(s) 54. The controller 74 may transmit a signal to the actuator 73 coupled to the beam splitter 68 to adjust an angle of the beam splitter 68 (e.g., by rotating the beam splitter 68 relative to the display system 66) based on the perspective of the guest(s) 54 to improve visualization of the transmitted element 70 and/or the reflected element 72. Additionally or alternatively, the controller 74 may instruct the actuator 73 to adjust a distance between the beam splitter 68 and the display system 66 (e.g., by translating the beam splitter 68 relative to the display system 66) based on the perspective of the guest(s) 54. Thus, the controller 74 may facilitate viewing of the reflected element 72 by the guest(s) 54.

Figure 2:
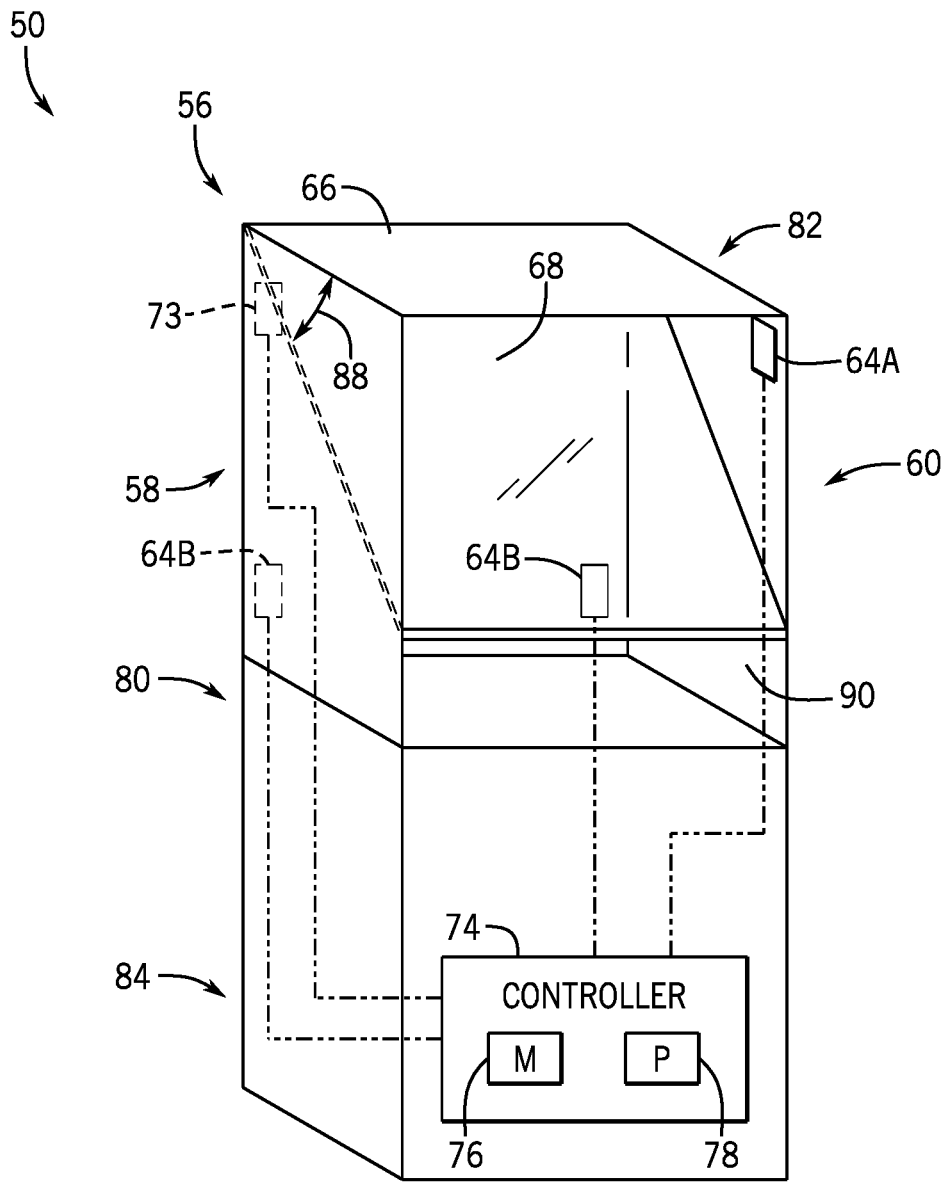
FIG. 2 is a front perspective view of an embodiment of the attraction system of FIG. 1, in accordance with an aspect of the present disclosure.

FIG. 2 is a front perspective view of an embodiment of the attraction system 50. In particular, FIG. 2 illustrates the show effect system 56 with a viewing portion 60 including one sensor 64A positioned adjacent to or within the viewing portion 60 (e.g., above an interaction space 58) and two sensors 64B positioned adjacent to or within the interaction space 58. In embodiments, the show effect system 56 may include any suitable number of sensor(s) 64A adjacent to or within the viewing portion 60 and any suitable number of sensors 64B adjacent to or within the interaction space 58. The sensor 64A may be positioned between the viewing portion 60 and a guest facing the viewing portion 60, and the sensor 64A may generate sensor data indicative of guest characteristics (e.g., viewing perspective). The sensors 64B may be positioned at various locations with respect to the interaction space 58 and may generate sensor data indicative of an object (e.g., the object 62 described with respect to FIG. 1) positioned within the interaction space 58. The show effect system 56 may also include a controller 74 positioned adjacent to (e.g., below) the interaction space 58 and the viewing portion 60. The controller 74 may be communicatively coupled to a display system 66 of the viewing portion 60, the sensor 64A of the viewing portion 60, the sensors 64B of the interaction space 58A, and an actuator 73 coupled to the beam splitter 68. In the illustrated embodiment, the sensors 64A, 64B are disposed within or coupled to an enclosure 80 of the show effect system 56. However, in other embodiments, the sensors 64A, 64B may be positioned outside of the enclosure 80 in a manner that allows monitoring of the viewing portion 60 and the interaction space 58, respectively.

As indicated above, the show effect system 56 may include an enclosure 80 (e.g., representative of multiple enclosures coupled to one another, or representative of a single enclosure). The enclosure 80 may define a first volume 82 having the interaction space 58 and the viewing portion 60. For example, the beam splitter 68 may be positioned within the first volume 82 to further divide the first volume 82 into the interaction space 58 and the viewing portion 60. The enclosure 80 may also define a second volume 84 in which the controller 74 may be positioned. However, in other embodiments the controller 74 may be external to the enclosure 80 and may even communicate wirelessly with other aspects of the show effect system 56. The enclosure 80 may include various features, such as walls, panels, and barriers, that may shield components of the show effect system 56 (e.g., the sensors 64A and 64B, the beam splitter 68, the controller 74) from various external elements, such as dust and debris. As such, the enclosure 80 may protect such components to enable desirable operation and/or prolong a useful lifespan of the show effect system 56. In additional or alternative embodiments, the enclosure 80 may include features, such as doors, that may enable access to a component, such as the controller 74, disposed within the enclosure 80. Thus, the enclosure 80 may enable various operations, such as an inspection operation, a maintenance operation, a repair operation, a replacement operation, to be performed with respect to the component, while also providing shielding capabilities for the show effect system 56.

The display system 66 may face the beam splitter 68 such that the virtual images projected from the display system 66 may reflect off the beam splitter 68 and into a perspective (e.g., line of sight) of a guest. The display system 66 may receive image data from the controller 74 and digitally render the virtual image based on the image data. The display system 66 may project the virtual image onto a certain area (e.g., portion) of the beam splitter 68 based on the image data. The reflected element (e.g., reflected virtual image) may appear to be located in the interaction space 58, as viewed by the guest. For example, the beam splitter 68 may be at an angle 88 (e.g., at 45 degree angle) with respect to the display system 66 to provide a desirable (e.g., realistic) appearance of the reflected element within the interaction space 58. However, in an embodiment, the controller 74 may instruct the actuator 73 to adjust the beam splitter 68 to any suitable angle, any suitable distance, and/or any other suitable position/orientation with respect to the display system 66. For example, the controller 74 may transmit a signal to the actuator 73 to adjust the beam splitter 68 based on sensor data. The sensor 64A of the viewing portion 60 may generate sensor data of the guest, which may include facial features, eye level, a height, an arm length, and the like, for transmission to the controller 74. The controller 74 may instruct the actuator 73 to adjust the beam splitter 68 based on the sensor data received from the sensor 64A. For example, the controller 74 may instruct the actuator 73 to adjust the beam splitter 68 to improve visibility of the reflected element, thereby enabling the show effects (e.g., combined imagery of transmitted element and reflected element) to be correctly viewed by the guest.

In an embodiment, the display system 66 may be a volumetric display that projects three-dimensional virtual images such that the reflected element may be appear with accurate depth and dimension from any perspective. The volumetric display may include a screen (e.g., film layer) that may rapidly and repeatedly transport through a volume while imagery may be projected onto the screen at various positions of the screen in a manner that creates an illusion of a three dimensional object due to persistence of vision effects on the guest (e.g., viewer). As such, the controller 74 may not instruct the actuator 73 to adjust an angle of the beam splitter 68. In an embodiment, the display system 66 may be behind the beam splitter 68 such that the virtual images projected from the display system 66 may be transmitted through the beam splitter 68 and into the perspective of the guest. Additionally, the display system 66 may include a first display 66 that faces the beam splitter 68 and projects virtual images for reflection off the beam splitter 68 and a second display 66 that may be behind the beam splitter 68 and projects virtual images for transmission through the beam splitter 68.

The controller 74 may also instruct the display system 66 to project a virtual image based on an object positioned within the interaction space 58. The enclosure 80 may define an aperture 90 that exposes the interaction space 58 to an external environment for access to the interaction space 58. For instance, the aperture 90 may enable positioning of an object (such as the object 62 described with respect to FIG. 1) into the interaction space 58 and/or removal of the object from the interaction space 58. For example, the guest may insert a hand into the aperture 90 during interaction with the show effect system 56. The sensors 64B within the interaction space 58 may generate sensor data indicative of a position of the guest's hand. In certain instances, the controller 74 may determine a size of the guest's hand and a relative location of the guest's hand based on the sensor data. The controller 74 may generate the image data to be transmitted to the display system 66 based on the size and the relative location of the guest's hand. The controller 74 may also determine a position of the image data to be projected by the display system 66 based on the relative location of the guest's hand. In this way, the controller 74 may instruct the display system 66 to project a virtual image to adjust an appearance of a reflected element to provide a more interactive experience for the guest. For example, the reflected element 72 may present as a virtual tattoo on the guest's hand and maybe adjusted to correspond to movement of the guest's hand within the interaction space 58.

Figure 3:
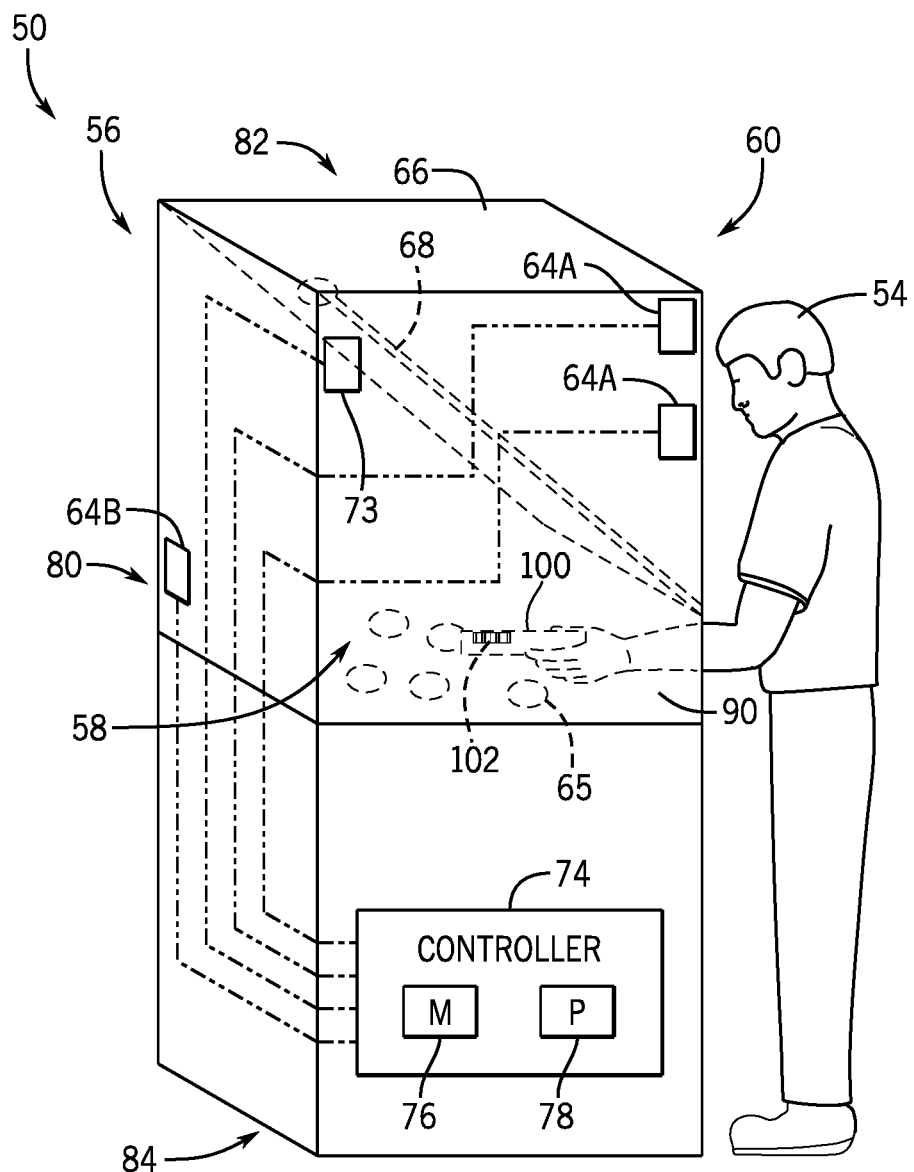
FIG. 3 is a side perspective view of an embodiment of the attraction system of FIG. 1, in accordance with an aspect of the present disclosure.

FIG. 3 is a side perspective view of an embodiment of the attraction system 50. In particular, FIG. 3 illustrates the show effect system 56, the interaction space 58 includes a physical object 100 (e.g., the object 62 described with respect to FIG. 1) extended into the interaction space 58 by a guest 54 via the aperture 90. The illustrated show effect system 56 also includes multiple markers 65 disposed in a grid pattern within the interaction space 58. For instance, the physical object 100 is represented as a ticket made of non-transparent material (e.g., paper, plastic, metal). However, the physical object 100 may be any suitable object, such as an appendage of the guest 54 (e.g., a hand), a good (e.g., food, book), a token, a map, a coin, or the like. The physical object 100 positioned within the interaction space 58 may be visible to the guest 54 through the beam splitter 68 as a transmitted element.

The sensor 64B of the interaction space 58 may generate sensor data (e.g., captured image data, location data) associated with the physical object 100. The controller 74 may identify a type of the physical object 100 based on the sensor data. For example, the controller 74 may utilize image analysis (e.g., processing) techniques to identify the type of the physical object 100 as the ticket. In an instance, the controller 74 may compare a shape of the physical object 100 with one or more shape(s) stored in the memory 76. In other instances, the ticket may include text descriptions and/or images that may be identified using image analysis techniques and matched with a description or image stored in the memory 76. In certain instances, the controller 74 may identify one or more identifiers 102 (e.g., QR code, barcode) on the physical object 100 and compare the one or more identifiers 102 to a list of identifiers stored in the memory 76. As illustrated, the physical object 100 includes a barcode that may be used by the controller 74 to identify the type of physical object 100.

The controller 74 may also determine the location of the physical object 100 within the interaction space 58 based on sensor data. For example, one or more of the marker(s) 65 may be placed in known locations within the interaction space 58 and the controller 74 may identify a relative location of the physical object 100 with respect to the one or more marker(s) 65 to determine the location of the physical object 100 within the interaction space 58. For example, the controller 74 may determine a relative distance between the physical object 100 and the beam splitter 68 to determine a size of the image data. In another example, the controller 74 may determine a location of the physical object 100 to determine a position of the image data. The controller 74 may determine the image data to be transmitted to the display system 66 based on the type and/or a location of the physical object 100 within the interaction space 58. For example, the controller 74 may identify image data associated with different types of objects that may be positioned within the interaction space 58.

The controller 74 may instruct the display system 66 to operate to alter the appearance of the physical object 100 by overlaying additional visual information. For example, the controller 74 may instruct the display system 66 to adjust an appearance of a ticket by projecting information related to the ticket, changing a color of the ticket by projecting a color over the ticket, and/or projecting an animation that appears to be displayed on the ticket. Such special effects may be realistically provided by the controller 74 based on the size and/or location of the physical object 100 within the interaction space 58 (e.g., by enabling the display 66 to project a virtual image that provides a reflected element corresponding to the appearance of the physical object 100 visible to the guest 54).

Figure 4:
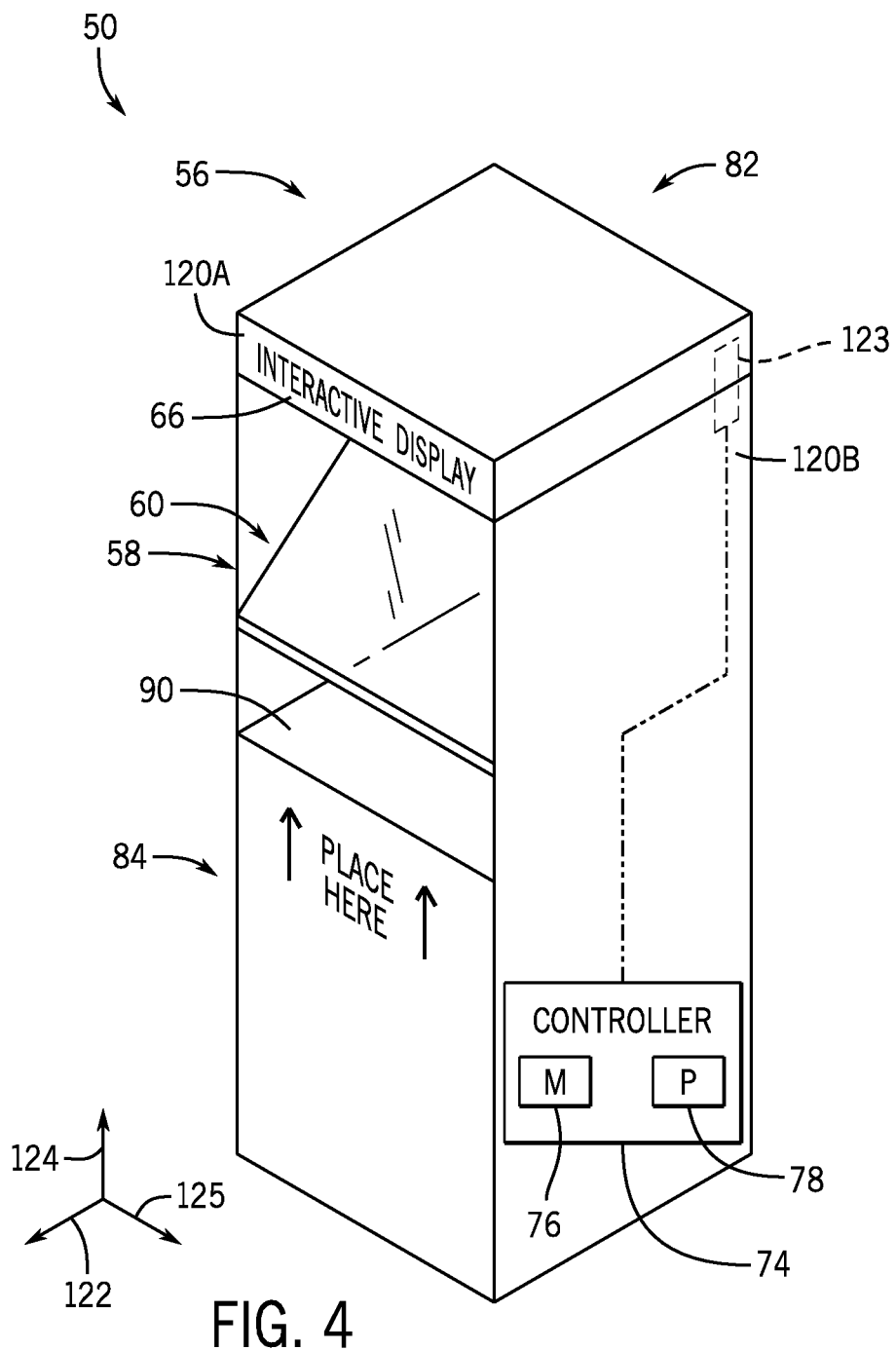
FIG. 4 is a perspective view of an embodiment of the attraction system of FIG. 1, in accordance with an aspect of the present disclosure.

FIG. 4 is a perspective view of an embodiment of the attraction system 50. In the illustrated embodiment of FIG. 4, the show effect system 56 may be an arc made-like configuration with a cover 120A to reduce or block ambient light directed to a certain part of the show effect system 56. For example, the cover 120A may at least partially enclose the viewing portion 60. The cover 120A may extend over (e.g., in overlap with) the beam splitter 68 in a longitudinal direction 122. The cover 120A may block light (e.g., directed toward the beam splitter 68 in a vertical direction 124). In an instance, the controller 74 may instruct an actuator 123 to extend, retract, or otherwise move the cover 120A. For example, in response to determining an intensity of light is below a threshold level (e.g., on a cloudy day in which the sun is partially obscured), the controller 74 may instruct the actuator 123 to retract the cover 120, thereby increasing an amount of light directed to the beam splitter 68 to increase visibility of the object within the interaction space 58. In response to determining the intensity of light is above the threshold level (e.g., on a sunny day in which the sun is not obscured), the controller 74 may instruct the actuator 123 to extend the cover 120, thereby reducing an amount of light directed to the beam splitter 68 to increase visibility of the reflected element in the viewing portion 60. For example, an increase in the intensity of light may decrease a relative brightness level of the virtual images (e.g., with respect to the guest's perspective). Extending the cover 120 may block the amount of light directed at the beam splitter 68 which may increase the relative brightness level of the virtual images, thereby improving visibility of the virtual image with respect to the guest's perspective. To this end, the sensors (e.g., sensors 64 described with respect to FIG. 1) of the show effect system 56 may generate sensor data indicative of light conditions (e.g., brightness level, intensity of light), and the controller 74 may instruct the actuator 123 to adjust the cover 120 based on the light conditions to provide the guest with a better viewing experience of the special effects provided by the show effect system 56.

Additionally or alternatively, the show effect system 56 may include a cover 120B on a lateral side of the show effect system 56. The cover 120B may extend across the lateral side of the show effect system 56 (e.g., along the longitudinal direction 122, along the vertical direction 124). As such, the cover 120B may reduce or block ambient light directed toward the beam splitter 68 in a lateral direction 125. The controller 74 may also instruct the actuator 123 to adjust the cover 120B based on detected light conditions. In this way, the covers 120A, 120B may cooperatively improve visibility by the guest of the show effect system 56. Additionally or alternatively, the covers 120A, 120B may direct the guest to look directly at the beam splitter 68 to improve visibility of the reflected element. In this way, the guest may not view the beam splitter 68 at an angle and may not view a distorted show effect.

In an embodiment, the interaction space 58 may include a light emitter (e.g., LED, OLED) to adjust a brightness level within the show effect system 56. For instance, the light emitter may be adjusted to ensure that the transmitted element is visible to the guest. For example, the controller 74 may determine an amount of light within the interaction space 58, which may indicate visibility of the object positioned within the interaction space 58 to the guest. Additionally or alternatively, the controller 74 may cause the rendering of the reflected element to be adjusted based on the appearance of the physical object 100, such as to adjust a brightness level of an image outputted by the display system 66 onto the beam splitter 68. As such, the controller 74 may provide various operations to adjust the visibility of the transmitted element and/or the reflected element by the guest.

Figure 5:
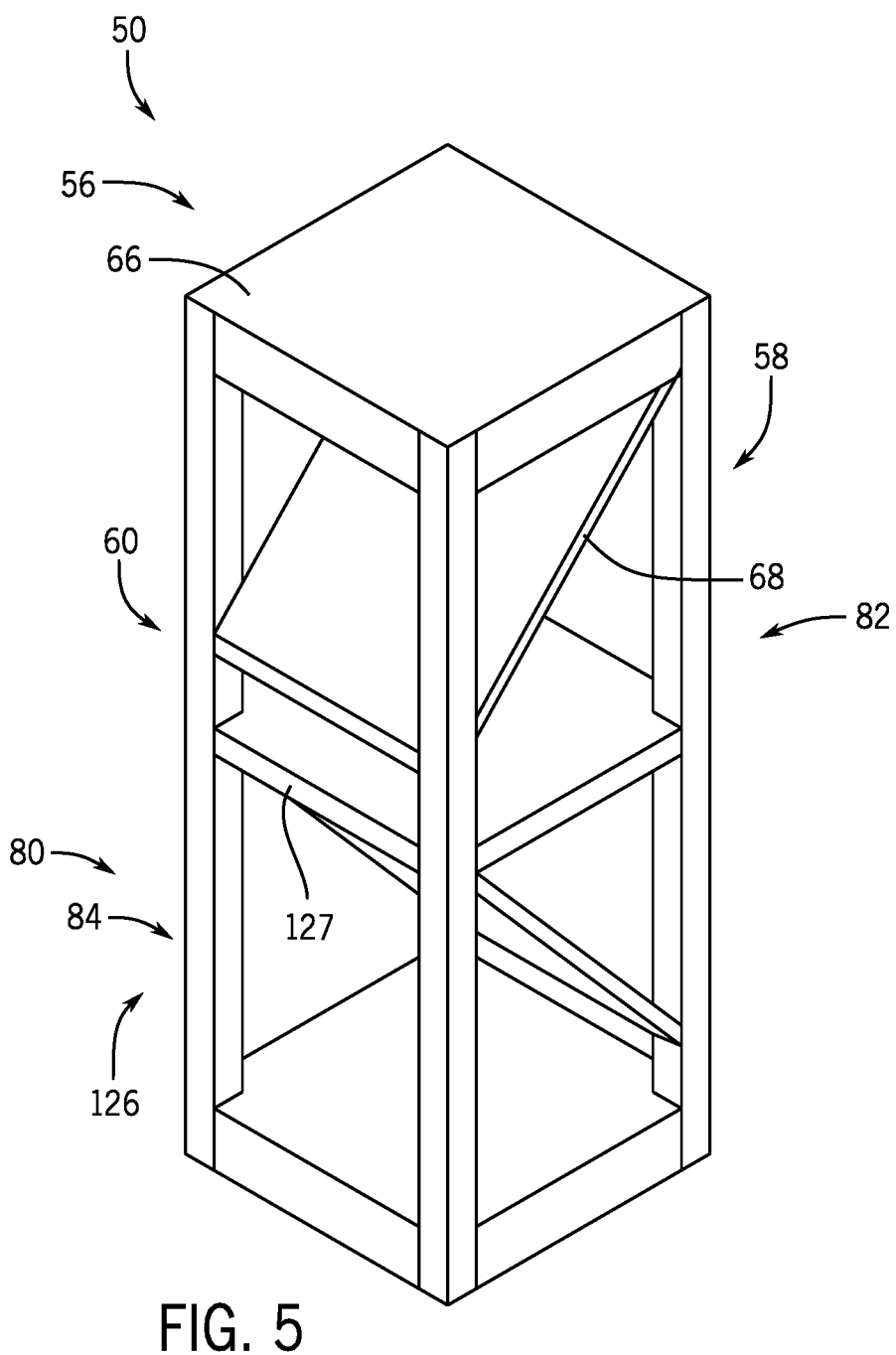
FIG. 5 is a perspective view of an embodiment of the attraction system of FIG. 1, in accordance with an aspect of the present disclosure.

FIG. 5 is a perspective view of the attraction system 50. In the illustrated embodiment of FIG. 5, the beam splitter 68 of the illustrated show effect system 56 extends and blocks access to the interaction space 58 from a guest-facing side 126 of the show effect system 56. For example, the enclosure 80 may include a partition 127 that divides and separates the first volume 82 and the second volume 84 of the enclosure 80 from one another. The beam splitter 68 may extend to abut against or contact the partition 127. Thus, the beam splitter 68 and the partition 127 may cooperatively define the interaction space 58. For this reason, the show effect system 56 may not include the aperture that enables positioning of an object within the interaction space 58. Additionally, the illustrated show effect system 56 may not include a cover on the lateral sides of the show effect system 56 (e.g., the covers 120B described with respect to FIG. 4). For example, the show effect system 56 may be integrated with a self-serve food line (e.g., buffet line), a display case with physical objects, a ticket line, and the like. In another example, the show effect system 56 may be integrated with a check-out counter of a grocery store, a display case for one or more products, a glass conference room and/or office, and the like. As such, the lateral sides of the show effect system 56 may be open (e.g., without covers) to facilitate guest interactions, such as to enable the guest to access the object positioned within the interaction space 58 from the lateral sides. The show effect system 56 may provide additional information, such as information about the physical object (e.g., food, toy, books, ticket). For example, the show effect system 56 may be integrated with a show case and display information about physical objects (e.g., toys, books) within a store. The physical object may be within the interaction space 58 and the controller 74 may cause corresponding information to be displayed adjacent the physical object, as viewed with respect to a guest. The display system 66 may receive image data from the controller 74 and project virtual images onto the beam splitter 68 to be as reflected element viewed by the guest. Sensors within the interaction space 58 may receive an indication of guest interactions (e.g., reaching for good, guest presence). In response to the indication, the controller 74 may generate image data with information about the good. For example, the information may include a price of the physical object, a quantity of the physical object, a return policy of the physical object, a serial number of the physical object, or the like. As a specific example, a conveyor belt may pass through the show effect system 56 such that items on the conveyor belt (e.g., plates of sushi) pass through the interaction space 58 and become viewable through the beam splitter 68 allowing for detection of the items via the sensors 64 and display of information about the items (e.g., ingredients of the sushi) via the reflected element.

Figure 6:
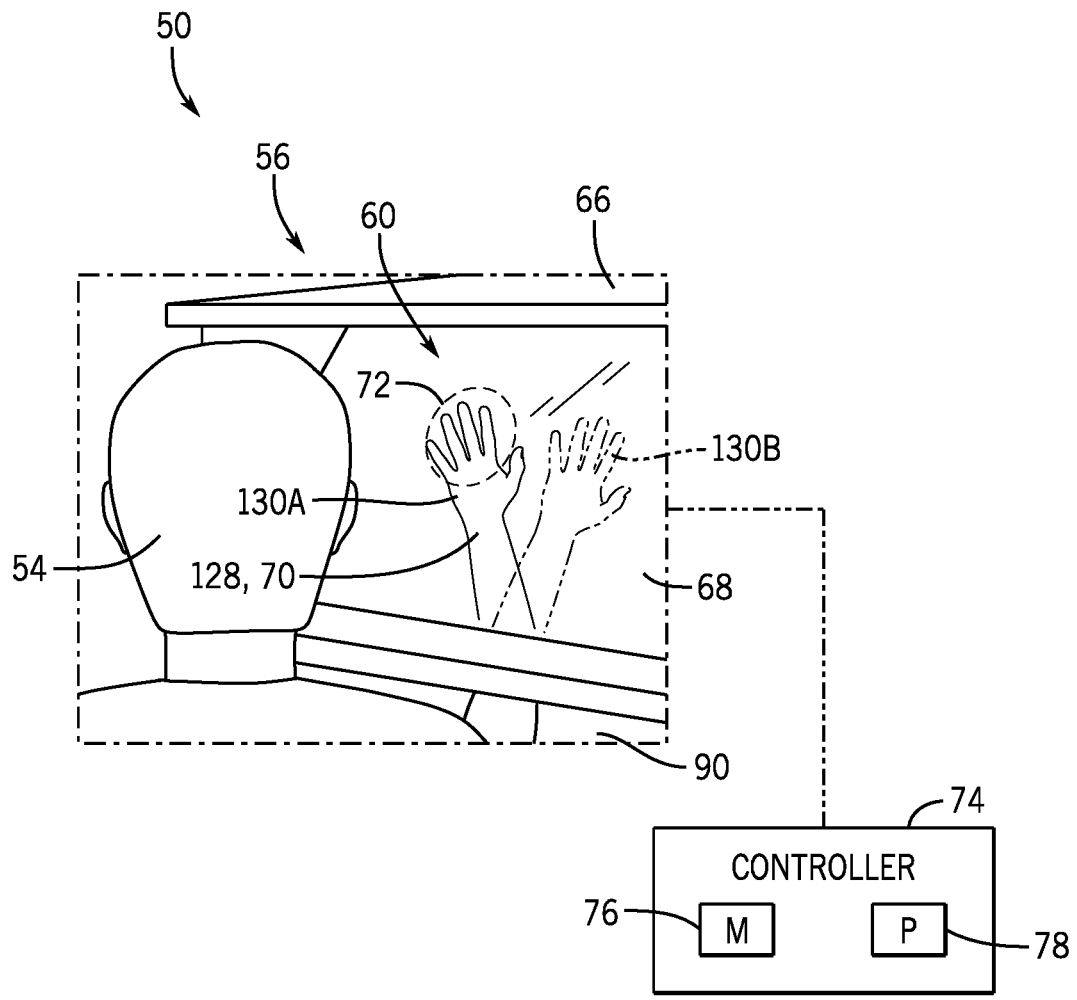
FIG. 6 is a front perspective view of the attraction system of FIG. 1 adjusting display of a show effect projection, in accordance with an aspect of the present disclosure.

FIG. 6 is a front perspective view of the attraction system 50 adjusting a display of a show effect projection. In particular, FIG. 6 illustrates a show effect (e.g., combined imagery of a transmitted element 70 and a reflected element 72) provided via the show effect system 56. By way of example, the guest 54 may extend their arm through the aperture 90 to position their hand 128 (e.g., object 62 described with respect to FIG. 1) within the interaction space 58 of the show effect system 56 for an interactive experience. The hand 128 may be seen through the beam splitter 68 by the guest 54 as the transmitted element 70. The show effect system 56 may operate to enhance or augment the appearance of the hand 128. For example, the show effect provided by the show effect system 56 includes a reflected element 72 that appears to be disposed (e.g., physically disposed) in the interaction space 58 as viewed with respect to the guest 54. Thus, the reflected element 72 may realistically appear as a physical object interacting with the hand 128 of the guest 54. As an example, the reflected element 72 may provide an appearance of an additional object, such as a fire, a cup, or a ball held in the hand 128 of the guest 54. As another example, the reflected element 72 may appear to transform the hand 128 to having a different appearance, such as wearing a glove, having scales, or emitting light. However, the reflected element 72 may include any suitable imagery that provides an appearance of interaction with or modification of the hand 128 of the guest 54.

In an embodiment, the controller 74 may be configured to effectuate the show effect by generating and transmitting image data to the display system 66 to cause the display system 66 to project a virtual image to provide the reflected element 72. For example, the sensors of the interaction space 58 may track a location of the hand 128, and the controller 74 may determine a location, a size, and/or a shape of the guest's hand relative to the beam splitter 68 based on the sensor data received from such sensors to create a realistic show effect. The controller 74 may instruct the display system 66 to generate and project the virtual image in the viewing portion 60 in order for the reflected element 72 to appear in the interaction space 58 at or near the location of the guest's hand as viewed by the guest 54. For example, a position of the virtual image projected by the display system 66 and reflected off the beam splitter 68 may cause the reflected element 72 to overlap with the guest's hand. In particular, the guest's hand may be at a location within the interaction space 58 and viewed by the guest as the transmitted element 70 through the beam splitter 68 at a location of visibility. The display system 66 may project the virtual image based on the location of visibility. For example, the transmitted element 70 and the reflected element 72 may overlap at the location of visibility to form the show effect. Additionally or alternatively, the controller 74 may also instruct the display system 66 to project the virtual image in the viewing portion 60 such that a size and/or shape of the reflected element 72 appears to conform to a profile of the guest's hand. Indeed, the reflected element 72 may appear to be combined or superimposed with the transmitted element 70. In an embodiment, the reflected element 72 may be presented such that a partially transparent effect enables the guest 54 to see their hand 128 through the reflected element 72 that is in overlap with their hand 128. However, the appearance of the reflected element 72 may not be distorted by the hand 128 or another object in the interaction space 58. Therefore, the reflected element 72 provided by the controller 74 may have a realistic or desirable appearance when in overlap with the hand 128.

The controller 74 may also instruct the display system 66 to adjust the appearance of the reflected element 72. For instance, the controller 74 may track movement of the hand 128 within the interaction space 58 and instruct the display system 66 to adjust projection of the virtual image to cause the reflected element 72 to follow the movement of the hand 128 (e.g., the maintain overlay of the reflected element 72 on the transmitted element 70 associated with the hand 128). As an example, the guest 54 may move their hand 128 within the interaction space 58, such as from a first location 130A to a second location 130B (e.g., left to right). The controller 74 may detect movement of the hand 128 based on the sensor data and instruct the display system 66 to adjust a position of the virtual image to cause the reflected element 72 to change positions to follow the hand 128 from the first location 130A to the second location 130B. As such, movement of the reflected element 72 may appear to be driven by movement of the hand 128. In certain instances, the guest 54 may move their hand 128 relative to the beam splitter 68, thereby changing a size of the transmitted element 70. The controller 74 may detect the movement and instruct the display system 66 to adjust a size of the virtual image to cause the reflected element 72 to change sizes to remain conformed to the appearance of the hand 128. Still in another example, the controller 74 may operate the display system 66 to offset the reflected element 72 from the appearance of the hand 128.

Figure 7:
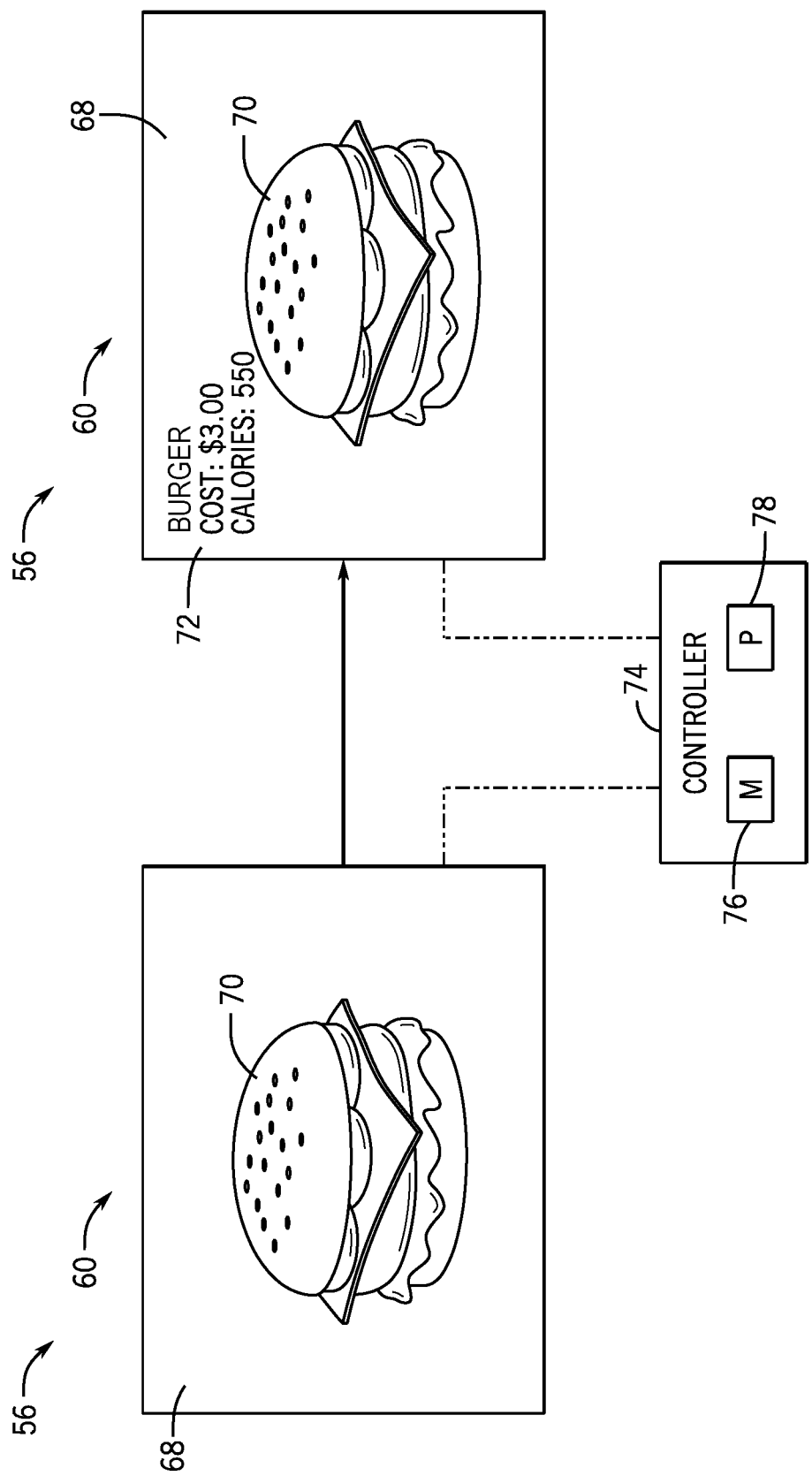
FIG. 7 is a schematic diagram illustrating a show effect provided by the show effect system of FIG. 1, in accordance with an aspect of the present disclosure.

FIG. 7 is a schematic diagram illustrating show effects provided by the show effect system 56. By way of example, the show effect system 56 may provide information about a good for purchase within the show effect system 56, such as for a self-serve food line. For instance, in addition to forming the interaction space and the viewing portion 60, the beam splitter 68 may serve as a sneeze-guard style panel of glass. One or more physical object(s) (e.g., a burger) may be placed in the interaction space. A guest visiting the self-serve food line may retrieve the physical good for purchase. In an additional or alternative embodiment, the show effect system 56 may be implemented in another context, and the physical object may include another suitable physical object, such as a book, a token, a map, and so forth.

As illustrated, the physical object may be visible through the beam splitter 68 as a transmitted element 70. The controller 74 may identify the physical object based on image analysis techniques and/or one or more identifier(s) of the physical object. In certain instances, the controller 74 may use image analysis techniques to determine a size, a shape, or a type of the physical object and match the size, shape, or type to one or more stored templates in the memory 76 in order to identify the physical object. In another example, the good may include one or more identifier(s). In other instances, the physical good may be a burger that sits on a plate and the plate may include one or more identifier(s), such as a barcode (e.g., a QR code) that may be identified by the controller 74. The controller 74 may match the one or more identifier(s) to one or more stored identifier(s) in the memory 76 in order to identify and/or retrieve image content corresponding to the chicken tender. For example, the controller 74 may generate image data associated with the physical object and transmit image data to the display system to cause the reflected element 72 to be displayed. The illustrated reflected element 72 includes information about the physical object, such as a type of physical object, a cost of the physical object, a nutritional value of the physical object. The controller 74 may cause the virtual image to be displayed in the viewing portion 60 in order to generate the reflected element 72 that appears to be in the interaction space. For example, the reflected element 72 may include information about the physical good, such as a cost of the good, a type of the good, a property of the good, and so on. In the illustrated example, the reflected element 72 displays the type of the good (e.g., BURGER), a cost of the good, (e.g . . . , COST: 3.00), and a property of the good (e.g., CALORIES: 550). Moreover, a portion of the reflected element 72 and a portion of the transmitted element 70 are overlaid with respect to one another to clearly associate the reflected element 72 with the physical object. In other examples, the reflected element 72 may be displayed adjacent to (e.g., above, below, at a side of) the transmitted element 70 with no overlap.

Each of FIGS. 8 and 9 described below illustrates a method or process for operation of the show effect system. Any suitable device (e.g., the processor 78 of the controller 74 illustrated in FIGS. 1-3 in coordination with other system components) may perform the respective methods. In an embodiment, each method may be implemented by executing instructions stored in a tangible, non-transitory, computer-readable medium (e.g., the memory 76 of the controller 74 illustrated in FIGS. 1-3). For example, each method may be performed at least in part by one or more software component(s), one or more software application(s), and the like. While each method is described using operations in a specific sequence, additional operations may be performed, the described operations may be performed in different sequences than the sequence illustrated, and/or certain described operations may be skipped or not performed altogether.

Figure 8:
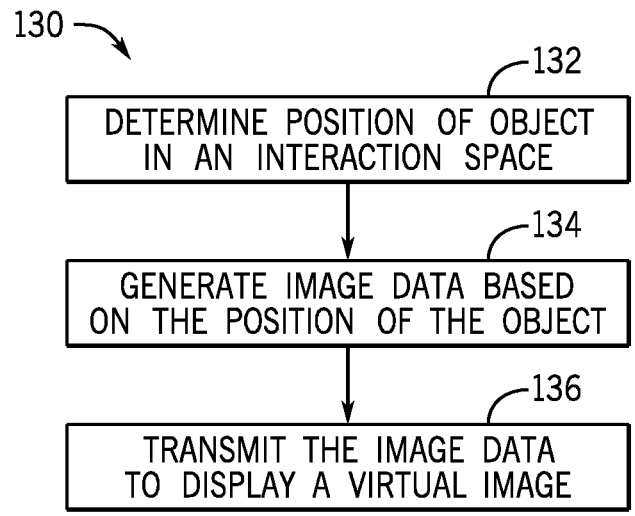
FIG. 8 is a flowchart of an embodiment of a method or a process for providing a show effect via the attraction system of FIG. 1, in accordance with an aspect of the present disclosure.

FIG. 8 is a flowchart of an embodiment of a method or process 130 for operating the show effect system to provide a realistic show effect. That is, the show effect system may be operated to provide a virtual image that may supplement the appearance of a real world object, as viewed by a guest.

At block 132, a parameter of an object (e.g., a real world object) within the interaction space of the show effect system may be determined. For example, the parameter may include a color, a texture, a reflectivity, a brightness, a size, a shape, an orientation, and/or a position of the object. The controller may determine the parameter of the object based on one or more marker(s) within the interaction space. In another example, the controller may receive image data captured for different areas within the interaction space, and the controller may determine the parameter of the object based on the different image data. Still in another example, the controller may determine a relative distance between the object and a beam splitter or other boundary of the interaction space.

At block 134, image data may be generated based on the parameter (e.g., position) of the object. For example, a size of the image data and/or a location for projecting the image data may be determined based on the parameter of the object within the interaction space. As an example, to provide image data that matches a size of the object viewed by a guest, a size of the image data may be inversely proportional to the distance of the object from the beam splitter. In other words, a size of the image data may be reduced as the distance between the object and the beam splitter increases. As another example, the controller may determine a target location for the image data based on the parameter of the object. For instance, the target location may cause the projected image data to provide a virtual image that is overlaid or in overlap with the object viewed by the guest.

At block 136, the image data may be transmitted to cause a virtual image to be presented in the viewing portion of the show effect system. For example, the image data transmitted to the display system may be projected in the target location on the beam splitter such that the reflected element and the transmitted element overlap and align with one another relative to a guest's line of sight. In another example, the image data transmitted to the display system may be offset in a direction such that a portion of the reflected element does not overlap with the transmitted element.

Additionally or alternatively, the image data may be generated based on the type of object. For example, the controller may identify a type of the object based on a shape of the object and/or a pattern of markers located on a side of the object. The controller may identify a match between the shape of the object and/or the pattern of markers with a corresponding shape and/or a corresponding pattern of markers stored in the memory, and the controller may determine a type of object associated with the matched shape and/or the pattern of markers. The controller may then identify image data associated with the type of object.

It should be noted that the method 130 may be continually or repeatedly performed. For example, the controller may continually monitor the parameter of the object in the interaction space and adjust the image data (e.g., a size of the image data, a location of the image data) based on the parameter of the object. As such, the image data may be adjusted and updated to provide a more suitable appearance based on the parameter of the object.

Figure 9:
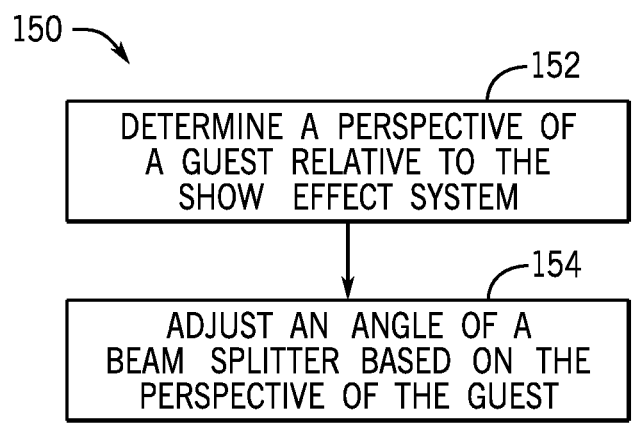
FIG. 9 is a flowchart of an embodiment of a method or process for operating the attraction system of FIG. 1, in accordance with an aspect of the present disclosure.

FIG. 9 is a flowchart of an embodiment of a method or a process 150 for operating the show effect system to provide a realistic show effect. For example, the method 150 may be performed to improve visibility of a reflected element by a guest. At block 152, a perspective of the guest relative to the show effect system may be determined. For example, sensors may generate sensor data indicative of a position of the guest relative to the beam splitter of the show effect system. For example, based on the sensor data, the controller may determine the guest attributes, such as a height of the guest, an arm length of the guest relative to the show effect system, and/or an orientation of the guest. In another example, the controller may determine a perception of the guest based on an eye level and/or facial features of the guest. The controller may also track eye movement of the guest to determine the perspective of the guest. In an embodiment, the guest may input one or more attributes, such as a color blindness status, a color contrast adjustment, the height of the guest, and the like. The controller may adjust a brightness level of the virtual images, a light intensity of the one or more light source(s), and/or an extension length of the cover. In this way, visibility of the virtual images may be improved based on the guest attributes.

At block 154, the beam splitter may be adjusted based on the perspective of the guest. In an embodiment, the controller may instruct an actuator to adjust an orientation of the beam splitter to provide a higher visibility of the reflected element. For example, the controller may instruct the actuator to position the beam splitter at an angle (e.g., at 45 degrees) with respect to the guest's perspective and/or with respect to the display system to change the visibility of the reflected element. In an additional or alternative embodiment, the controller may adjust a position of the beam splitter (e.g., relative to the display system) to change the visibility of the reflected element.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more element(s) designated as "means for (perform) ing (a function) . . . " or "step for (perform) ing (a function) . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A show effect system of an amusement park, the show effect system comprising:
   an enclosure;
   an interaction space within the enclosure, wherein the interaction space is configured to receive an object;
   a display system configured to present imagery;
   an adjustable beam splitter positioned to enable visibility from a viewing portion:
      into the interaction space through the adjustable beam splitter; and
      of the imagery via reflection off the adjustable beam splitter;
   a sensor configured to monitor the interaction space and provide sensor data related to the object within the interaction space; and
   one or more controllers communicatively coupled to the sensor and the display system, wherein the one or more controllers are configured to perform operations comprising:
      determining one or more parameters of the object and an identifier on the object based on the sensor data;
      determining a type of the object based on the identifier on the object;

generating image data based on at least one parameter of the one or more parameters of the object and the type of the object;
instructing transmittal of the image data to the display system; and
instructing the display system to present the imagery based on the image data.

2. The show effect system of claim 1, comprising an additional sensor configured to monitor eye movement of a guest in the viewing portion, wherein the additional sensor is communicatively coupled to the one or more controllers and configured to transmit additional sensor data indicative of the eye movement of the guest.

3. The show effect system of claim 2, comprising an actuator coupled to the adjustable beam splitter and communicatively coupled to the one or more controllers, wherein the one or more controllers are configured to instruct the actuator to adjust an orientation and/or position of the adjustable beam splitter relative to the display system based on the additional sensor data.

4. The show effect system of claim 1, wherein the one or more controllers are configured to:
determine a size or a position of the object based on the sensor data; and
generate or adjust the imagery based on the size or the position of the object.

5. The show effect system of claim 1, wherein the enclosure comprises one or more apertures that expose the interaction space to an external environment for access to the interaction space.

6. The show effect system of claim 1, wherein the interaction space comprises one or more reflective markers, and wherein the one or more controllers is configured to:
determine a location of the object based on at least one distance measure between the object and at least one reflective marker of the one or more reflective markers.

7. The show effect system of claim 1, wherein the one or more controllers is configured to:
determine a target location of one or more virtual images of the imagery to be presented by the display system onto the adjustable beam splitter based on the one or more parameters of the object; and
instruct the display system to present the one or more virtual images based on the target location.

8. The show effect system of claim 7, wherein the one or more parameters comprises a relative distance between the object and the adjustable beam splitter.

9. The show effect system of claim 1, comprising an actuatable cover set comprising one or more actuatable first covers extending over the adjustable beam splitter and one or more actuatable second covers on one or more lateral sides of the enclosure, wherein the actuatable cover set is configured to reduce or block ambient light directed onto the adjustable beam splitter.

10. A non-transitory computer-readable medium, comprising instructions that, when executed by one or more processors, are configured to cause the one or more processors to perform operations comprising:
receiving user input indicative of one or more guest preferences;
determining one or more characteristics of a viewer based on sensor data from one or more sensors monitoring a viewing location of a show effect system;
determining one or more parameters of an object disposed within an interaction area of the show effect system based on additional sensor data received from one or more additional sensors monitoring the interaction area, wherein the object is visible from the viewing location as a transmitted element through a beam splitter;
instructing one or more actuators to adjust an orientation or position of the beam splitter based on the sensor data;
generating image data based on the one or more parameters of the object and the one or more guest preferences; and
instructing a display system to project one or more virtual images onto the beam splitter based on the image data to cause the one or more virtual images to be visible, from the viewing location, via reflection off the beam splitter as a reflected element that overlaps with the transmitted element.

11. The non-transitory computer-readable medium of claim 10, wherein the instructions, when executed by the one or more processors, are configured to cause the one or more processors to perform operations comprising:
determining one or more types of the object based on one or more identifiers on the object detected based on the additional sensor data; and
generating the image data associated with the one or more types of the object.

12. The non-transitory computer-readable medium of claim 10, wherein the instructions, when executed by the one or more processors, are configured to cause the one or more processors to perform operations comprising:
determining movement of the object from a first position within the interaction area to an additional position within the interaction area; and
updating the image data based on the additional position of the object within the interaction area.

13. The non-transitory computer-readable medium of claim 10, wherein instructing the display system to project the one or more virtual images onto the beam splitter comprises:
instructing a first display of the display system to project a first virtual image of the one or more virtual images onto the beam splitter; and
instructing a second display of the display system to project a second virtual image of the one or more virtual images onto the beam splitter, wherein the first virtual image and the second virtual image overlap to form the reflected element.

14. The non-transitory computer-readable medium of claim 10, wherein the instructions, when executed by the one or more processors, are configured to cause the one or more processors to perform operations comprising:
determining a line of sight of the viewer in the viewing location based on the sensor data; and
instructing the one or more actuators of the beam splitter to move and/or orient the beam splitter based on the line of sight of the viewer in the viewing location.

15. An attraction system for an attraction, the attraction system comprising:
an enclosure comprising a beam splitter that defines an interaction space and a viewing portion within the enclosure, wherein the interaction space is configured to receive an object, the viewing portion comprises a three-dimensional display system configured to project one or more virtual images onto the beam splitter, and the beam splitter is configured to enable visibility of the object within the interaction space through the beam splitter and to enable visibility of the one or more virtual images projected onto the beam splitter via reflection off the beam splitter;

a cover configured to at least partially enclose the viewing portion;

one or more sensors configured to track movement of the object and determine an intensity of light directed towards the beam splitter, wherein the object is disposed within the interaction space; and a controller configured to:
receive sensor data from the one or more sensors, wherein the sensor data is indicative of the movement of the object disposed within the interaction space and/or the intensity of light directed towards the beam splitter;

instruct an actuator to adjust a position of the cover with respect to the beam spli based on a comparison between the intensity of light and a threshold intensity of light;

generate image data based on the movement of the object disposed within the interaction space as indicated by the sensor data; and instruct the three-dimensional display system to project the one or more virtual images onto the beam splitter based on the image data to cause the one or more virtual images to combine to form an illusion of a three-dimensional image and be visible via the reflection off the beam splitter at a first location of visibility that is based on a second location of the visibility of the object through the beam splitter.

16. The attraction system of claim 15, comprising one or more additional actuators, wherein the controller is configured to instruct the one or more additional actuators to move and/or orient the beam splitter within the enclosure.

17. The attraction system of claim 16, comprising one or more additional sensors configured to determine one or more parameters indicative of a position of a user relative to the beam splitter, wherein the controller is configured to instruct the one or more additional actuators to move and/or orient the beam splitter within the enclosure based on the position of the user relative to the beam splitter.

18. The attraction system of claim 15, wherein the controller is configured to instruct the three-dimensional display system to project at least one virtual image of the one or more virtual images onto the beam splitter to overlap the first location of visibility of the one or more virtual images via the reflection off the beam splitter with the second location of visibility of the object through the beam splitter.

19. The attraction system of claim 15, comprising a light emitter positioned within the interaction space and configured to emit light, wherein the controller is configured to:
instruct the light emitter to emit light in response to determining an amount of light within the interaction space is less than a threshold amount of light.

20. The attraction system of claim 15, wherein the controller is configured to:
instruct the actuator to extend the cover in a longitudinal direction such that the cover overlaps with the beam splitter in response to determining the intensity of light is greater than the threshold intensity of light.

* * * * *